Nov. 1, 1955 J. F. NENZELL 2,722,043
SEALING STRIP
Filed July 27, 1953
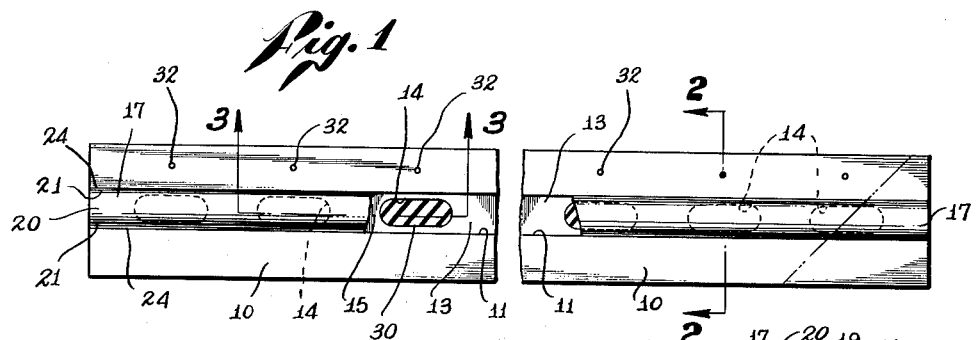
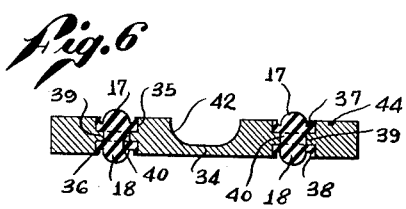
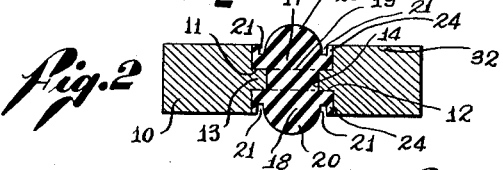
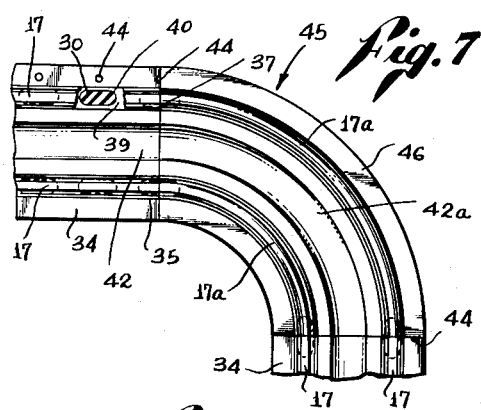
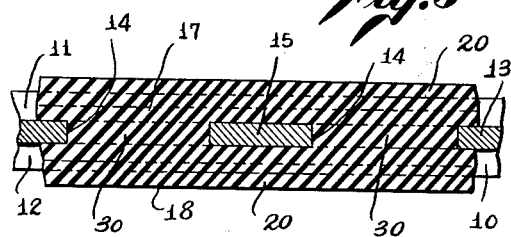
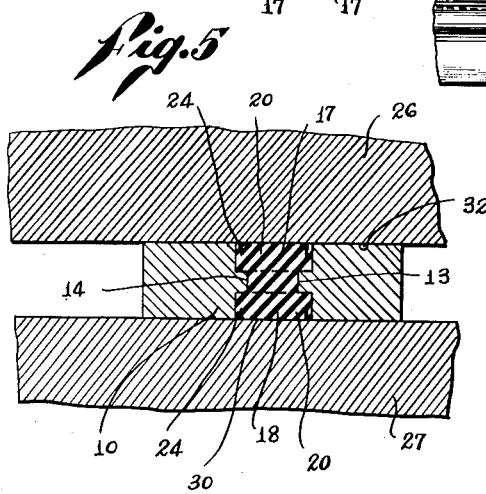
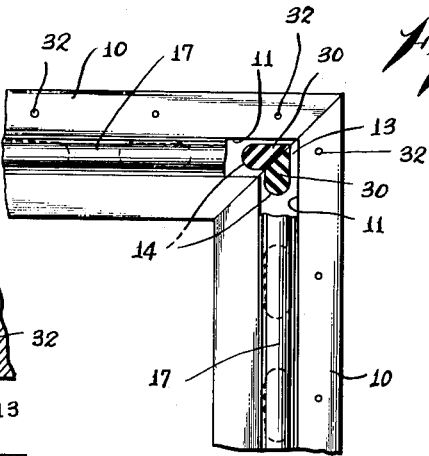
INVENTOR.
JOSEPH F. NENZELL
BY Tulwider, Mattingly & Babcock
Attorneys

United States Patent Office 2,722,043
Patented Nov. 1, 1955

2,722,043

SEALING STRIP

Joseph F. Nenzell, Culver City, Calif., assignor to The Mathewson Corporation, Inglewood, Calif., a corporation of California Application July 27, 1953, Serial No. 370,352

8 Claims. (Cl. 20—69)

This invention relates generally to sealing means, and more particularly to a sealing strip which can be used in making a seal of any desired rectilinear configuration for sealing between opposed mating parts.

The sealing principles employed in this invention are generally similar to those disclosed in my copending application, Serial No. 319,697 filed November 10, 1952, for "Fluid Seal and Manufacture Thereof." Reference is made to the aforesaid application for a complete discussion of the principles involved in manufacturing and using a seal of this general character.

The present invention has for its specific object the provision of a sealing strip which can be cut and joined to form a seal of desired configuration for particular installations. In other words, sealing strips of convenient length can be precision formed in the factory to achieve proper volumetric relationships between the packing members and retaining bodies, and then fitted to shape for particular installations by the use of simple hand tools. This is especially advantageous in the formation of seals of large size which must be given configuration corresponding to the edge outline of doors, cover plates, and the like. The formation of a one-piece seal for such purposes would be extremely expensive and difficult due to its size alone.

A preferred embodiment of the present invention comprises a rigid retaining body of elongated linear form having retaining grooves on opposed outer surfaces thereof fitted with resilient deformable packing members. The packing members are sectionally profiled to form a central projection extending beyond the surface of the retaining body, and are bonded together. The strips are extended along the periphery of the mating parts which it is desired to seal together, so that as the parts are drawn together, the packing members are compressed within the retaining grooves and makes lines of sealing contact with the faces of the parts.

In order to effectively use sealing strips which are joined together to form a seal of desired configuration, it is necessary to achieve a seal across the joint between adjoining strips as well as between the sealing strips and the mating parts. This problem is overcome in the use of the invention by the particular shape of the packing members with respect to the retaining body, and the connectors by which the packing members are secured within the body. By cutting the ends of the sealing strips in accordance with the principles of the invention, the end surfaces of the connectors as well as the packing members, can be brought together in matched abutting relationship. Thus, a relatively large, unbroken area of contact between the end surfaces of the connectors and packing members is provided across the strip joint so that any possible fluid leakage is prevented.

With the foregoing in mind, it is a major object of the invention to provide a sealing strip having resilient deformable packing members mounted within a relatively rigid retaining body, and bonded together by connectors of such character that the strips can be joined together to place the packing members in matched abutting relationship and form a large, unbroken area of sealing contact therebetween.

It is also an object of the invention to provide a sealing strip of the character described in which the packing members are in opposed back-to-back relationship and are bonded together and against movement within a retaining body by a plurality of spaced connectors molded integrally with the packing members.

A further object of the invention is to provide a plurality of packing member connectors which are spaced at short regular intervals along the length of the retaining body and are of elongated shape to provide for the flow of packing material between the packing members.

It is another object of the invention to provide a sealing strip having indicia marks opposite each of said connectors to visibly indicate the location of the connectors for sectioning through a connector in forming a joint between adjoining strips in which the connectors as well as the packing members are in matched abutting relationship.

Still another object of the invention is to provide sealing strips of the character described which can be economically formed to precision dimensions.

A still further object of my invention is to provide a modified form of the invention having pairs of spaced packing members bracketing a central channel extended along the retaining body and adapted to receive a flowable sealing compound therein.

These and other objects and advantages of the invention will become apparent from the following detailed description of a preferred form thereof, and from an inspection of the accompanying drawings in which:

Figure 1 is a plan view partially in section of a portion of a preferred embodiment of the strip;

Figure 2 is a cross-section taken along the line 2—2 of Figure 1;

Figure 3 is a longitudinal medial section taken along the line 3—3 of Figure 1;

Figure 4 is a plan view showing a joint between adjoining strips;

Figure 5 is a sectional view showing a strip in sealing relationship between opposed mating parts;

Figure 6 is a cross-section similar to Figure 2 taken through a modified form of the invention; and Figure 7 is a plan view of a corner joint for the modified form.

Referring now to the drawings, and particularly to Figure 1 thereof, the numeral 10 indicates an elongated body of relatively rigid material. Body 10 is of flat rectangular cross-section and is provided with longitudinally extending retainer grooves 11 and 12 on the upper and lower surfaces which lie in back-to-back relationship and are separated by a thin body web 13. Spaced along the body web 13 at relatively close and regular intervals are a plurality of openings 14. Each of the openings 14 is of the same shape which is preferably elongated with semi-circular rounded ends. As may be noted in Figure 3, the openings 14 cover a substantial portion of the length of web 13 in relationship to the length of the remaining solid web portions designated at 15.

Extended longitudinally along the body 10 are a pair of packing members 17 and 18 which lie within the grooves 11 and 12, respectively, as is best seen in Figure 2. Packing members 17 and 18 are formed of a resilient deformable material, such as synthetic rubber, and have opposed, but similar cross-sectional shapes. The bottom portion of the members 17 and 18 is a solid rectangular block 19 which completely fills the bottom corners of grooves 11 and 12. Formed integrally with the bottom portion 19 is a raised central projection 20 which is of rounded cross-section and extends outwardly beyond the adjacent faces of body 10 in its normal uncompressed position. As can be understood, the shape of central projection 20 defines side channels or void spaces 21 which lie at both sides of the central projection and within the respective grooves 11 and 12.

Formed integrally with the bottom portion 19 and lying adjacent the side walls of the grooves 11 and 12 are side spacer pieces or fillets 24 which extend outwardly and terminate flush with the top of the grooves. Fillets 24 are of variable width to prevent variations in the width of channels 21. This type of seal requires a particular volumetric relationship between the portion of the central projection 20 lying outside of the retaining body and the channels 21, as is achieved by forming the fillets 24 when the packing members 17 and 18 are molded into the grooves 11 and 12. Reference is made to my aforesaid copending application for a complete disclosure of the method of molding packing members into the retaining grooves and the desired volumetric relationships.

In general, the total volume of channels 21 should be substantially equal to the volume of the projection 20 which lies outside of the grooves 11 and 12 and beyond the surface of body 10. When the faces of mating parts 26 and 27 are pressed inwardly against body 10, as is seen in Figure 5, projection 20 is forced to yield inwardly or deform resiliently and is flattened downwardly into channels 21. In order that projection 20 fit wholly within channels 21 and not be extruded or cold flowed, it is necessary that the aforesaid volumetric relationships be accurately controlled. This is achieved by the method of molding the packing members 17 and 18 directly within the retaining body 10 and the formation of the side fillets 24.

Both packing members 17 and 18 are molded into the grooves 11 and 12 simultaneously flowing packing material under pressure into a suitable mold. As the packing material flows into the mold, it is confined under substantial pressure and enters into the openings 14 along the body web 13 as well as into the grooves 11 and 12. The packing material which enters openings 14 fills the openings and results in the formation of connectors 30 which are bonded integrally with both of the packing members 17 and 18. Connectors 30 are quite naturally spaced along body 10 in accordance with the position of openings 14 and serve the dual function of securing packing members 17 and 18 to each other, and against movement within body 10. Since the connectors 30 are defined in accordance with the walls of openings 14, they have a corresponding elongated shape as may best be seen in the sectional detail of Figure 1. The elongated shape of connectors 30 and their relatively close spacing facilitates the flow of packing material between the packing members 17 and 18 and provides for the optimum pressure balance between the packing members and the opposed mating parts.

In considering the sealing function of the device, it can be understood that the flattened projections 20 form lines of sealing contact with the faces of parts 26 and 27 as seen in Figure 5. The side fillets 24 also form supplemental lines of sealing contact as has been described in my aforesaid application. Since the packing members 17 and 18 are under resilient compression and are at the same time confined within body 10 a very effective seal is provided across the junction of the mating parts.

The seal, so described, extends along the entire length of body 10, which as previously mentioned, is of elongated strip form. By joining strips to provide a configuration following the peripheral outline of mating parts, a continuous line of sealing contact can be provided. Thus, it is quite easy to form a seal around the periphery of a large door, cover, or the like, by forming a built-up seal from the strips as disclosed. The actual installation of the sealing strips is quite simple and may be accomplished with the use of any type of fasteners. In joining the strips to each other, the ends are simply cut to make the desired angle of intersection and brought together in a butt joint. If the strips are joined end-to-end, the cut is normally made perpendicular to the length of the strips. If other angles of intersection are desired, a mitered butt joint is most desirable. Figure 4 illustrates the manner in which strips intersecting at right angles may be joined in a mitered joint.

However, the problem of joining the strips to make a composite seal is not solved by a mere mechanical joinder, for the joint between strips must be sealed at the same time. This requires that the packing members 17 and 18 of each strip be joined in matched abutting relationship with those of the adjoining strips. Furthermore, it can be seen that if the strips are sectionally cut through one of the openings 14 the central connectors 30 will be exposed, while if a section is taken through one of the web portions 15, only the separated packing members 17 and 18 will be exposed.

Figure 2 shows a section taken through an opening 14 and exposes a section of connector 30 as well as packing members 17 and 18. As can be appreciated, a section so taken provides the maximum unbroken area of surface for making sealing contact against the packing members of an adjoining strip. As seen in Figure 4, both strips have been cut across an opening 14 so that the abutting ends of the packing members 17 and 18 and the connector 30 join in matching relationship. When the sealing strips are so joined, a very good seal may be obtained between the adjoining strips. Since all of the resilient packing material is under compression, the packing members 17 and 18 tend to project longitudinally as they are freed down into the grooves by the faces of the adjoining parts. Thus, a very good area of sealing contact is provided across the plane of joinder of the intersecting sealing strips.

From the foregoing, it can be seen that in order to make the most effective joinder between sealing strips, each strip should be sectioned across one of the openings 14 so as to cut through a connector 30. However, it can also be understood that the connectors 30 are totally covered by the packing members 17 and 18 and cannot be visually located. For this reason, I provide a plurality of spaced indicia marks 32 which are disposed on one of the surfaces of body 10 in the form of small indentations. Each of the marks 32 is located opposite the center of one of the openings 14 so that it visually indicates the location of the central plane of the connector 30 passing therethrough. Thus, in cutting the strips for joinder, the cutting plane is easily taken through the center of connectors 30 by measurement relative to the marks 32. The marks 32 may also serve a supplemental function in locating the spacing of fasteners which are to be used in the installation.

In Figures 6 and 7, I have shown a modified form of the invention which uses the same principles as the preferred form, but has a retaining body provided with spaced pairs of packing members and a central channel for receiving a flowable sealing compound. Such a sealing compound is often used where the mating parts must be sealed against corrosive fluid and provides a supplemental line of sealing contact. The use of a sealing strip in combination with a sealing compound permits the separation of the mating parts without disturbing the sealing compound.

As shown, an elongated body 34 is formed of flat, rectangular cross-section and is formed of relatively rigid material. Body 34 is provided with spaced pairs of longitudinally extending upper and lower retainer grooves 35 and 36, and 37—38, which lie in back-to-back relationship and are separated by thin body webs 39. Spaced along the body webs, as in the preferred form, are a plurality of openings 40 which lie at relatively close and regular intervals. On the upper face of body 34 between the grooves 35 and 37 is a relatively large longitudinally extending channel 42 which is adapted to receive and hold a flowable sealing compound.

Fitted with the grooves 35—36 and 37—38 are packing members 17 and 18 as previously described. The relationship of the packing members to the retaining grooves and their sealing functions are the same as in the preferred form and need not be repeated. As can be understood, the purpose of providing spaced packing members is to effectively seal off the channel 42, and prevent any flow of the sealing compound outside of the channel.

In order to locate the position of openings 40 one face of body 34 is provided with indicia marks 44 spaced opposite the center of each of the openings as seen in Figure 7. These function in the same manner as the indicia marks 32, and facilitate the cutting of the strips across one of the packing member connectors 30 for making a corner joint. For the purpose of providing a radiused corner bend in the channel 42 upon joinder of strips, I form a corner fitting 45 as shown in Figure 7. Fitting 45 has a rigid body 46 having retaining grooves spaced at the side of a radiused central channel 42a, and is fitted with packing members 17a and 18a which are similar to packing members 17 and 18 in all respects except that they are radiused to follow channel 42a. Joinder of member 45 to right angularly extending strips 34 is done as illustrated, so as to provide a tight seal across the packing members in the same manner as previously described.

While I have thus shown and described in some detail preferred and modified forms of the invention, changes of design will be apparent to those skilled in the art without departing from the scope of my invention. Therefore, I do not wish to be restricted except as defined in the appended claims.

I claim:

1. A sealing strip for use in forming a seal between opposed mating parts which comprises: a linear retaining body having substantially opposed part-engaging surfaces, said surfaces each being provided with a longitudinally extending groove and said grooves being interconnected back-to-back by a plurality of spaced openings of a size less than the width of said grooves; a resilient packing member molded in each of said grooves with a bottom portion filling the bottom of said groove and an outer projection extending beyond the surface of said body for engagement with one of said parts, said member having a channel therein lying within said groove whereby said member may be confined within said groove when said parts are drawn against said body; connectors extending through said openings and formed integrally with said members to secure said members to each other and against movement within said body; and, indicia marks on one of said surfaces opposite each of said openings to visibly indicate the location of said connectors.

2. A sealing strip for use in forming a seal between opposed mating parts which comprises: a linear retaining body having substantially opposed part-engaging surfaces, said surfaces each being provided with a longitudinally extending groove and said grooves being interconnected back-to-back by a plurality of spaced openings of a size less than the width of said grooves; a resilient packing member molded in each of said grooves with a bottom portion filling the bottom of said groove and an outer projection extending beyond the surface of said body for engagement with one of said parts, said member having a channel therein lying within said groove whereby said member may be confined within said groove when said parts are drawn against said body; connectors extending through said openings and formed integrally with said members to secure said members to each other and against movement within said body; indicia marks on one of said surfaces opposite each of said openings to visibly indicate the location of said connectors for sectioning through said connectors in forming a joint between adjoining strips in which said connectors and said members of both of said strips are in matched abutting relationship.

3. A sealing strip for use in forming a seal between opposed mating parts which comprises: a linear retaining body having substantially opposed part-engaging surfaces, said surfaces each being provided with a longitudinally extending groove and said grooves being interconnected back-to-back by a plurality of spaced openings of a size less than the width of said grooves; a resilient packing member molded in each of said grooves with a bottom portion filling the bottom of said groove and an outer central projection extending beyond the surface of said body for engagement with one of said parts, said member having channels therein on both sides of said central projection and lying within said groove, and having a total volume substantially as great as the volume of the central projection which lies beyond said body surface whereby said member may be confined within said groove when said parts are drawn against said body; connectors extending through said openings and formed integrally with said members to secure said members to each other and against movement within said body; and indicia marks on one of said surfaces opposite each of said openings to visibly indicate the location of said connectors for sectioning through said connectors in forming a joint between adjoining strips in which said connectors and said members of both of said strips are in matched abutting relationship.

4. A sealing strip for use in forming a seal between opposed mating parts which comprises: a linear retaining body having substantially opposed part-engaging surfaces, said surfaces each being provided with a longitudinally extending groove and said grooves being interconnected back-to-back by a plurality of spaced openings of a size less than the width of said grooves; a resilient packing member molded in each of said grooves with a bottom portion filling the bottom of said groove and an integral outer portion divided into side fillets abutting the sides of said grooves and a central projection extending beyond the surface of said body for engagement with one of said parts, said fillets and said central projection defining channels in said member lying on both sides of said central projection and within said groove, and having a total volume substantially equal to the volume of the central projection which lies beyond said body surface whereby said member may be confined within said groove when said parts are drawn tightly against said body; connectors extending through said openings and formed integrally with said members to secure said members to each other and against movement within said body; and indicia marks on one of said surfaces opposite each of said openings to visibly indicate the location of said connectors for sectioning through said connectors in forming a joint between adjoining strips in which said connectors and said members of both of said strips are in matched abutting relationship.

5. A sealing strip for use in forming a seal between opposed mating parts which comprises: a linear rigid retaining body having substantially opposed part-engaging surfaces, said surfaces being provided with longitudinally extending grooves separated by a central body web having spaced along the length thereof at uniform short intervals a plurality of openings interconnecting said grooves and of a size less than the width of said grooves; a resilient packing member molded in each of said grooves with a bottom portion filling the bottom of said groove and an outer central projection extending beyond the surface of said body for engagement with one of said parts, said member having channels therein on both sides of said central projection and lying within said groove, and having a total volume substantially as great as the volume of the central projection which lies beyond said body surface whereby said member may be confined within said groove when said parts are drawn against said body; connectors extending through said openings and formed integrally with said members to secure said members to each other and against movement within said body; and indicia marks on one of said surfaces opposite each of said openings to visibly indicate the location of said connectors for sectioning through said connectors in forming a joint between adjoining strips in which said connectors and said members of both of said strips are in matched abutting relationship.

6. A sealing strip for use in forming a seal between opposed mating parts which comprises: a linear rigid body having substantially parallel part-engaging surfaces, said surfaces being provided with longitudinal grooves of generally rectilinear cross-section in back-to-back relationship and of approximate depth and width, said grooves being separated by a central body web having spaced along the length thereof at uniform short intervals, a plurality of openings interconnecting said grooves and of a size less than the width of said grooves; a resilient packing member molded in each of said grooves with a bottom portion filling the bottom of said groove and an integral outer portion divided into side fillets abutting the sides of said grooves and a central projection extending beyond the surface of said body for engagement with one of said parts, said fillets and said central projection defining channels in said member lying on both sides of said central projection and within said groove, and having a total volume substantially equal to the volume of the central projection which lies beyond said body surface whereby said member may be confined within said groove when said parts are drawn tightly against said body; connectors extending through said openings and formed integrally with said members to secure said members to each other and against movement within said body; and indicia marks on one of said surfaces opposite each of said openings to visibly indicate the location of said connectors for sectioning through said connectors in forming a joint between adjoining strips in which said connectors and said members of both of said strips are in matched abutting relationship.

7. A sealing strip for use in forming a seal between opposed mating parts which comprises: a linear rigid body having substantially parallel part-engaging surfaces, said surfaces being provided with longitudinal grooves of generally rectilinear cross-section in back-to-back relationship and of approximate depth and width, said grooves being separated by a central body web having spaced along the length thereof at uniform short intervals, a plurality of openings interconnecting said grooves and of a size less than the width of said grooves; a resilient deformable packing member molded in each of said grooves with an outer portion divided into straight-walled side fillets lying adjacent the sides of said groove and a central projection of rounded cross-section extending beyond the surface of said body for engagement with one of said parts, said fillets and said central projection defining channels in said member lying on both sides of said central projection and within said groove, the total volume of said channels being as great as the volume of the central projection which lies beyond said body surface whereby said member may be confined wholly within said groove when said parts are drawn against said body, and an integral bottom portion completely filling the bottom of said groove; connectors extending through the openings in said web and formed integrally with said members to secure said members to each other, said connectors being shaped to fill said openings to prevent lengthwise movement of said members within said bodies; indicia marks on one of said surfaces opposite each of said openings to visibly indicate the location of said connectors for sectioning through said connectors in forming a joint between adjoining strips in which said connectors and said members of both of said strips are in matched abutting relationship.

8. A sealing strip for use in forming a seal between opposed mating parts which comprises: a linear rigid body having substantially parallel part-engaging surfaces, said surfaces being provided with longitudinal grooves of generally rectilinear cross-section in back-to-back relationhip and of approximate depth and width, said grooves being separated by a central body web having spaced along the length thereof at uniform short intervals a plurality of elongated openings interconnecting said grooves and of a size less than the width of said grooves; a resilient packing member molded in each of said grooves with a bottom portion filling the bottom of said groove and an integral outer portion divided into side fillets abutting the sides of said grooves and a central projection extending beyond the surface of said body for engagement with one of said parts, said fillets and said central projection defining channels in said member lying on both sides of said central projection and within said groove, and having a total volume substantially equal to the volume of the central projection which lies beyond said body surface whereby said member may be confined within said groove when said parts are drawn tightly against said body; connectors extending through said openings and formed integrally with said members to secure said members to each other and against movement within said body; and indicia marks on one of said surfaces opposite each of said openings to visibly indicate the location of said connectors for sectioning through said connectors in forming a joint between adjoining strips in which said connectors and said members of both of said strips are in matched abutting relationship.

References Cited in the file of this patent

UNITED STATES PATENTS

| | | |
|---|---|---|
| 323,731 | Phillips | Aug. 4, 1885 |
| 368,189 | Carter | Aug. 16, 1887 |
| 494,402 | Walsh | Mar. 28, 1893 |
| 1,986,465 | Dempsey | Jan. 1, 1935 |
| 2,208,620 | Baisch | July 23, 1940 |

FOREIGN PATENTS

| | | |
|---|---|---|
| 211,185 | Great Britain | Feb. 13, 1924 |